United States Patent
Adams

(10) Patent No.: US 9,178,905 B1
(45) Date of Patent: *Nov. 3, 2015

(54) ENABLING CUSTOM COUNTERMEASURES FROM A SECURITY DEVICE

(71) Applicant: Juniper Networks, Inc., Sunnyvale, CA (US)

(72) Inventor: Kyle Adams, Brisbane, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 14/147,261

(22) Filed: Jan. 3, 2014

(51) Int. Cl.
  *G06F 21/55* (2013.01)
  *G06F 21/75* (2013.01)
  *H04L 29/06* (2006.01)

(52) U.S. Cl.
  CPC .................................. *H04L 63/1441* (2013.01)

(58) Field of Classification Search
  CPC ....... G06F 21/55; G06F 21/75; G06F 21/554; H04L 63/14; H04L 63/1441
  USPC .......................................... 726/11–14, 22, 23
  See application file for complete search history.

(56) References Cited

U.S. PATENT DOCUMENTS

| | | | |
|---|---|---|---|
| 8,621,621 B1 | 12/2013 | Burns et al. | |
| 9,043,916 B1 * | 5/2015 | Burns et al. | 726/24 |
| 2007/0074169 A1 * | 3/2007 | Chess et al. | 717/126 |
| 2007/0199050 A1 * | 8/2007 | Meier | 726/4 |
| 2010/0218253 A1 * | 8/2010 | Sutton et al. | 726/23 |
| 2012/0210434 A1 * | 8/2012 | Curtis et al. | 726/25 |
| 2014/0026179 A1 * | 1/2014 | Devarajan et al. | 726/1 |

* cited by examiner

*Primary Examiner* — Joseph P Hirl
*Assistant Examiner* — Kalish Bell
(74) *Attorney, Agent, or Firm* — Harrity & Harrity, LLP

(57) ABSTRACT

A security device may receive information identifying a set of conditions for providing countermeasure code to a client device. The security device may receive information identifying an action to be performed when the countermeasure code is executed by the client device, and may determine the countermeasure code to be provided to the client device when the set of conditions is satisfied. The security device may receive a request from the client device, and may determine a response to the request. The response may include response code for serving content of a web page to the client device. The security device may determine that the set of conditions has been satisfied, and may insert the countermeasure code into the response code. The security device may provide the response code and the countermeasure code to the client device, and the countermeasure code may cause the client device to perform the action.

20 Claims, 11 Drawing Sheets

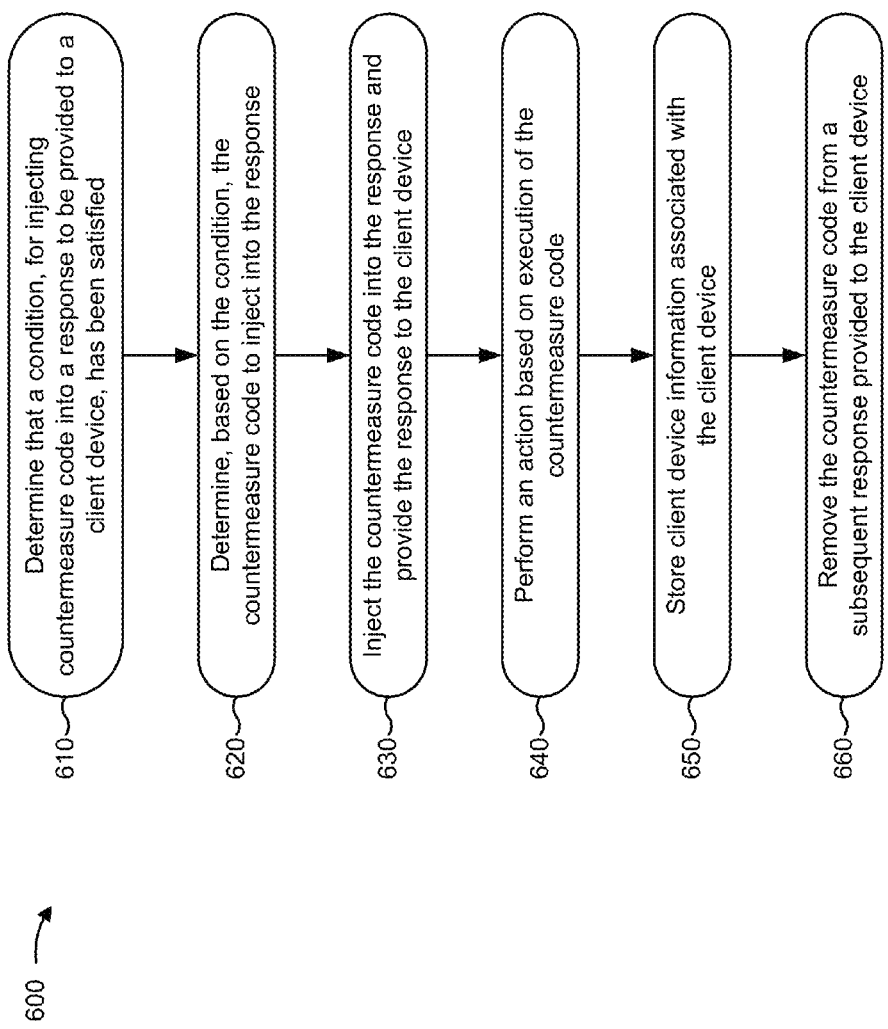

ENABLING CUSTOM COUNTERMEASURES FROM A SECURITY DEVICE

BACKGROUND

A security device operating as a reverse proxy may detect malicious actions from a user. In such a case, the security device may alter communications between a client device, associated with the malicious user, and a server device (e.g., a web server), such that that malicious user is thwarted. For example, the security device may block the malicious user.

SUMMARY

According to some possible implementations, a security device may include one or more processors configured to: receive information identifying a set of conditions for injecting countermeasure code into a response to be provided to a client device; receive information identifying an action to be performed when the countermeasure code is executed by the client device; determine the countermeasure code to be provided to the client device when the set of conditions is satisfied; receive a request from the client device, the request being intended for a server device associated with the security device; receive, from the server device, the response to the request; determine that the set of conditions has been satisfied; inject the countermeasure code into the response based on determining that the set of conditions has been satisfied; provide the response, with the countermeasure code, to the client device, the countermeasure code causing the client device to perform the action; determine client device information based on providing the response to the client device; and modify or remove the countermeasure code from a subsequent response provided to the client device based on the client device information.

According to some possible implementations, a computer-readable medium may store one or more instructions that, when executed by one or more processors, cause the one or more processors to: receive information identifying a set of conditions for providing countermeasure code to a client device; receive information identifying an action to be performed when the countermeasure code is executed by the client device; determine the countermeasure code to be provided to the client device when the set of conditions is satisfied; receive a request from the client device; determine a response to the request, the response including response code for serving content of a web page to the client device; determine that the set of conditions has been satisfied; insert the countermeasure code into the response code based on determining that the set of conditions has been satisfied; and provide the response code and the countermeasure code to the client device, the countermeasure code causing the client device to perform the action.

According to some possible implementations, a method may include: receiving, by a security device, information that identifies a set of conditions for providing countermeasure code to a client device; receiving, by the security device, information that identifies an action to be performed when the countermeasure code is executed by the client device; determining, by the security device, the countermeasure code to be provided to the client device when the set of conditions is satisfied; receiving, by the security device, a request from the client device; determining, by the security device, a first response to the request, the first response including response code for serving content to the client device; determining, by the security device, that the set of conditions has been satisfied; inserting, by the security device, the countermeasure code into the response code based on determining that the set of conditions has been satisfied; providing, by the security device, the response code and the countermeasure code to the client device, the countermeasure code causing the client device to perform the action; and preventing, by the security device, the countermeasure code from being included in a second response provided to the client device.

BRIEF DESCRIPTION OF THE DRAWINGS

FIG. 6 is a flow chart of an example process for counteracting a malicious action performed by a user against a server device.

DETAILED DESCRIPTION

The following detailed description of example implementations refers to the accompanying drawings. The same reference numbers in different drawings may identify the same or similar elements.

A security device, positioned to transfer traffic between a client device and a server device, may detect malicious actions performed by a user of the client device. Based on detecting the malicious actions, the security device may perform actions to counteract the malicious actions, such as by denying access to the server device by the malicious user and/or the client device, providing a warning message to the client device and/or the server device, or the like. However, a security device that uses pre-configured actions to counteract a malicious user may not have the flexibility to perform the most effective actions to counteract the malicious user. Also, the malicious user might learn about a pre-configured action, and may circumvent the action. Implementations described herein allow an administrator, associated with a sever device being protected by a security device, to create a custom counteraction to malicious actions performed by a user, such as a hacker. The security device may also make such responses difficult for the user to detect so that the user is unable to avoid the counteractions.

Figure 1A:
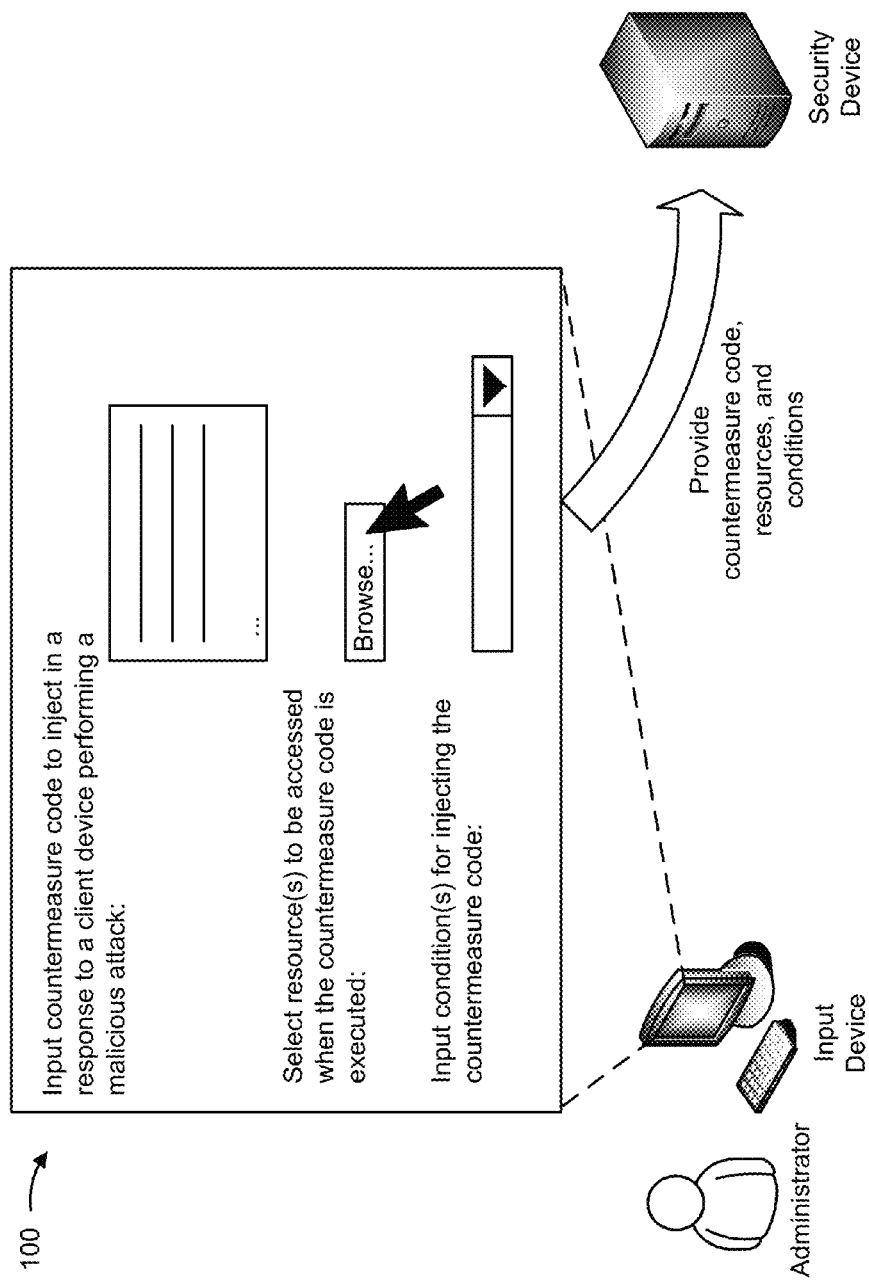
FIGS. 1A and 1B are diagrams of an overview of an example implementation described herein.
Figure 1B:
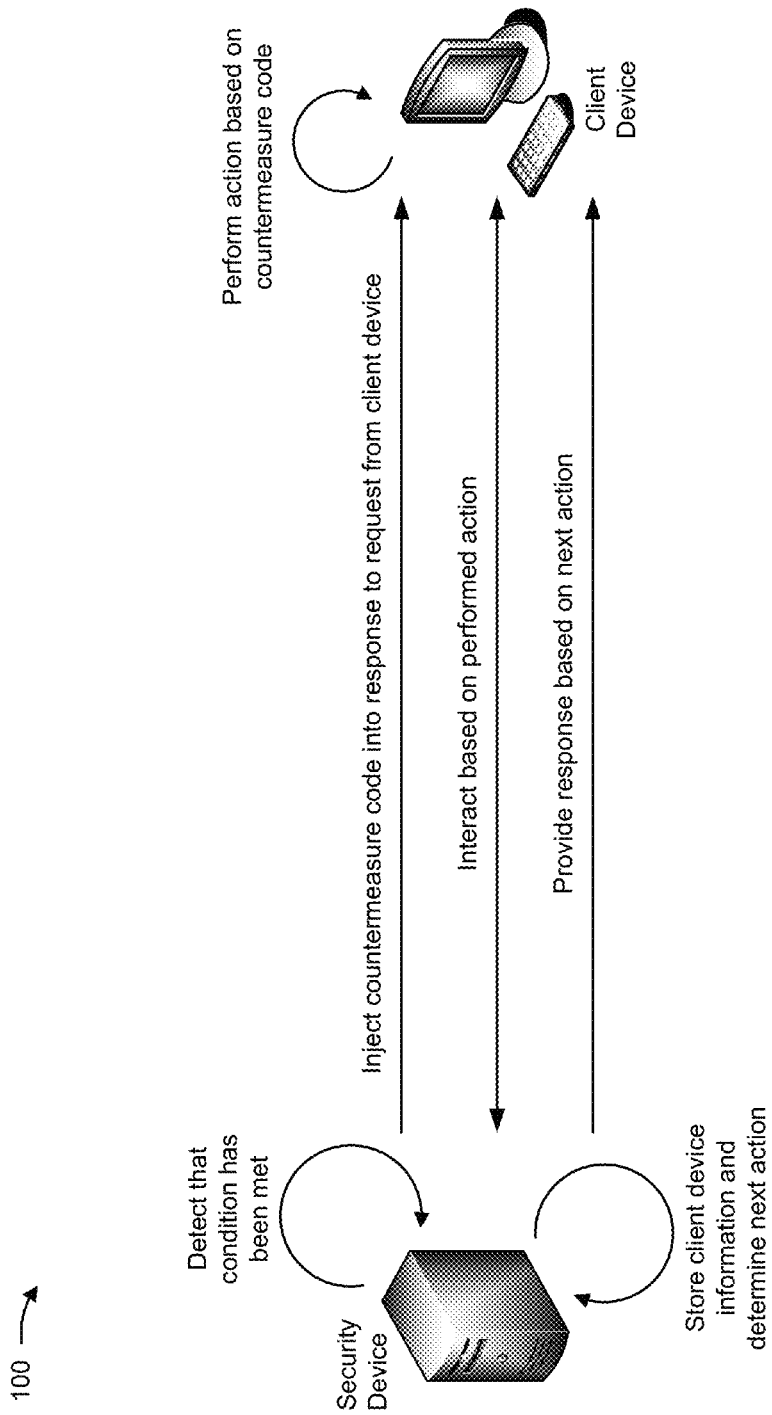

FIGS. 1A and 1B are diagrams of an overview of an example implementation 100 described herein. As shown in FIG. 1A, an administrator, associated with a server device being protected by a security device, may provide input to the security device to define a custom scenario for counteracting a user using a client device to perform a malicious attack against the server device. As shown, the administrator may input countermeasure code to inject in a response (e.g., a Hypertext Transfer Protocol (HTTP) response) provided to the client device when the security device determines that the client device is performing a malicious attack on the server device (or when some other set of conditions is met). As further shown, the administrator may input information identifying one or more resources to be used in the counteraction scenario, such as an image to be provided to the client device for display, a video to be provided to the client device for playback, or the like.

As further shown in FIG. 1A, the administrator may input information identifying one or more conditions that, when satisfied, cause the security device to inject the countermeasure code in a response provided to the client device. For example, a condition may identify when the countermeasure code is to be injected in a response (e.g., when a malicious attack is detected). As shown, the countermeasure code, the resources, and the conditions identified by the administrator may be provided to the security device.

As shown in FIG. 1B, the security device may detect that the set of conditions has been met, and may inject the countermeasure code into a response to a request from the client device. In some implementations, the security device may inject the countermeasure code based on an injection parameter input by the administrator. The injection parameter may indicate, for example, whether the countermeasure code is to be injected in a single response or multiple responses, where the countermeasure code is to be injected into the response, or the like. As shown, the countermeasure code may be executed by the client device, and may cause the client device to perform some action, such as requesting a resource, terminating a connection, etc. The security device and the client device may interact based on the performed action and/or the countermeasure code. For example, the security device may receive information associated with the action (e.g., may determine whether the action was performed, may receive client device information, etc.), may receive a request for a resource identified in the countermeasure code (e.g., identified by the administrator as described in connection with FIG. 1A), may provide the resource, etc. This interaction may be customized by the administrator so that the security device can respond to user actions in an appropriate manner.

As further shown in FIG. 1B, the security device may store client device information based on the interaction. For example, the security device may store information indicating an action performed by the client device, indicating a quantity of times that countermeasure code was injected in a response to the client device, etc. As further shown, the security device may determine a next action to perform, which may be based on the client device information, the information input by the administrator, or the like. The security device may provide a response to the client device based on the next action. For example, the security device may remove previously provided countermeasure code from a subsequent response so that a user is unable to detect the counteraction by the security device. As another example, the security device may provide different countermeasure code that causes the client device to perform another action based on a previous action performed by the client device. In this way, the security device may flexibly respond to malicious actions performed by a client device against a server device by providing an administrator with the ability to create a custom scenario for counteracting the malicious actions. Additionally, or alternatively, the security device may flexibly respond to non-malicious attacks (e.g., may provide help based on determining that a user is performing actions that indicate that the user in confused).

Figure 2:
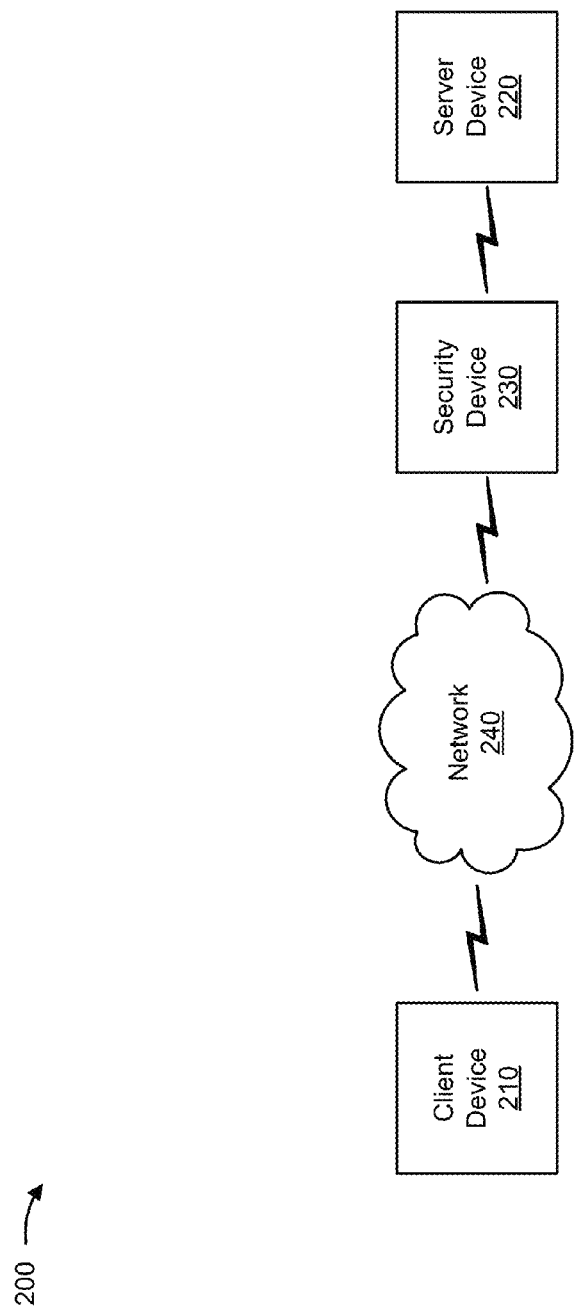
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a server device 220, a security device 230, and a network 240. Devices of environment 200 may interconnect via wired connections, wireless connections, or a combination of wired and wireless connections.

Client device 210 may include one or more devices capable of receiving and/or providing information over a network (e.g., network 240), and/or capable of generating, storing, and/or processing information received and/or provided over the network. For example, client device 210 may include a computing device, such as a laptop computer, a tablet computer, a handheld computer, a desktop computer, a mobile phone (e.g., a smart phone, a radiotelephone, etc.), a personal digital assistant, or a similar device. Client device 210 may receive information from and/or provide information to server device 220 (e.g., via network 240 and/or security device 230). In some implementations, client device 210 may include a browser used to interact with server device 220, such as by sending requests (e.g., HTTP requests) to server device 220 and/or receiving responses (e.g., HTTP responses) from server device 220. In some implementations, requests from client device 210 may be processed by security device 230 before being sent to server device 220.

Server device 220 may include one or more devices capable of receiving and/or providing information over a network (e.g., network 240), and/or capable of generating, storing, and/or processing information received and/or provided over the network. For example, server device 220 may include a computing device, such as a server (e.g., an application server, a content server, a host server, a web server, etc.) or a similar device. Server device 220 may receive information from and/or provide information to client device 210 (e.g., via network 240 and/or security device 230). Server device 220 may respond to requests (e.g., requests for resources) received from client device 210. In some implementations, responses from server device 220 may be processed by security device 230 before being sent to client device 210.

Security device 230 may include one or more devices capable of processing and/or transferring traffic between client device 210 and server device 220. For example, security device 230 may include a network device, such as a reverse proxy, a server (e.g., a proxy server), a traffic transfer device, a gateway, a firewall, a router, a bridge, a hub, a switch, a load balancer, or the like. Security device 230 may protect server device 220 from client device 210 by detecting a malicious attack from client device 210 (e.g., by detecting a set of conditions satisfied by client device 210 and/or traffic associated with client device 210). In some implementations, security device 230 may intercept a request from client device 210, intended for server device 220, and may provide countermeasure code to client device 210 intended to counteract a malicious action by client device 210. In some implementations, security device 230 may inject the countermeasure code in a response, to the request, received from server device 220.

Security device 230 may be used in connection with a single server device 220 or a group of server devices 220 (e.g., a data center). Communications may be routed through security device 230 to reach the one or more server devices 220. For example, security device 230 may be positioned within a network as a gateway to a private network that includes one or more server devices 220. Additionally, or alternatively, communications from client device 210 may be encoded such that the communications are routed to security device 230 before being routed to server device 220.

Network 240 may include one or more wired and/or wireless networks. For example, network 240 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
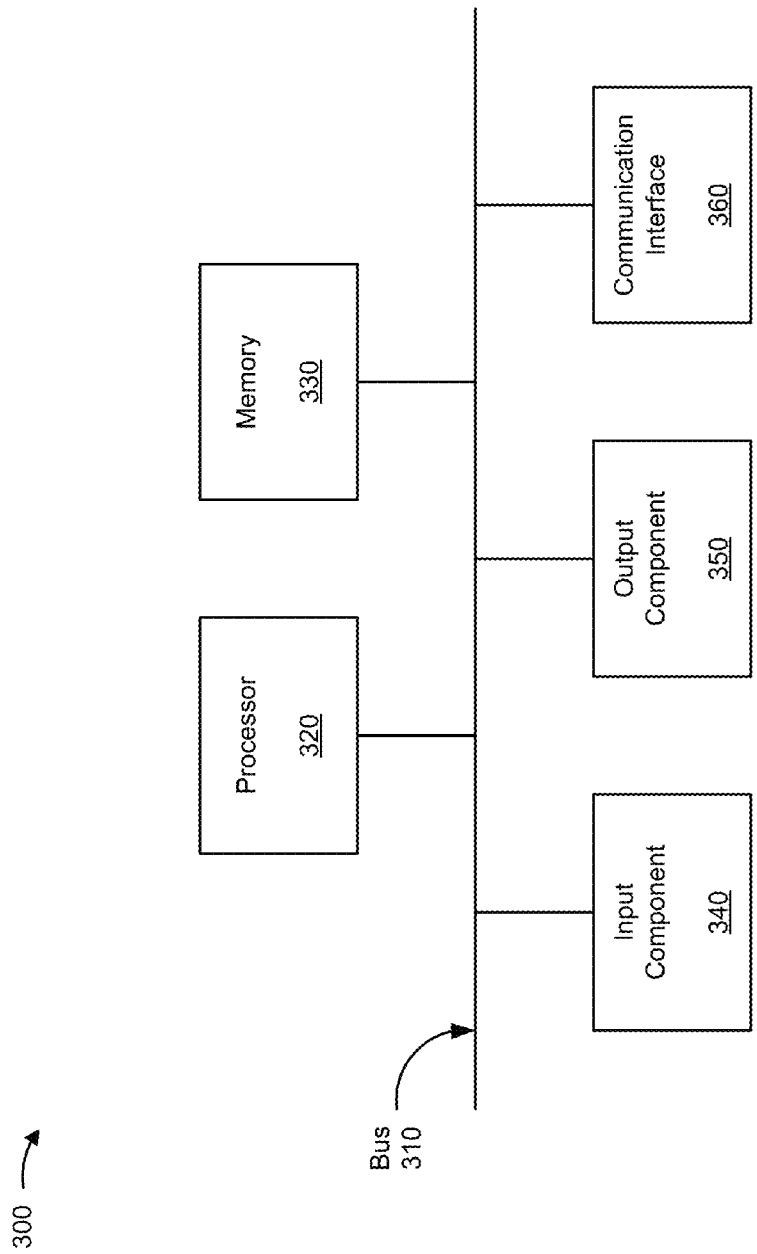
FIG. 3 is a diagram of example components of one or more devices of FIG. 2.

FIG. 3 is a diagram of example components of a device 300, which may correspond to client device 210, server device 220, and/or security device 230. In some implementations, client device 210, server device 220, and/or security device 230 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor (e.g., a central processing unit, a graphics processing unit, an accelerated processing unit), a microprocessor, and/or a processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

Figure 4:
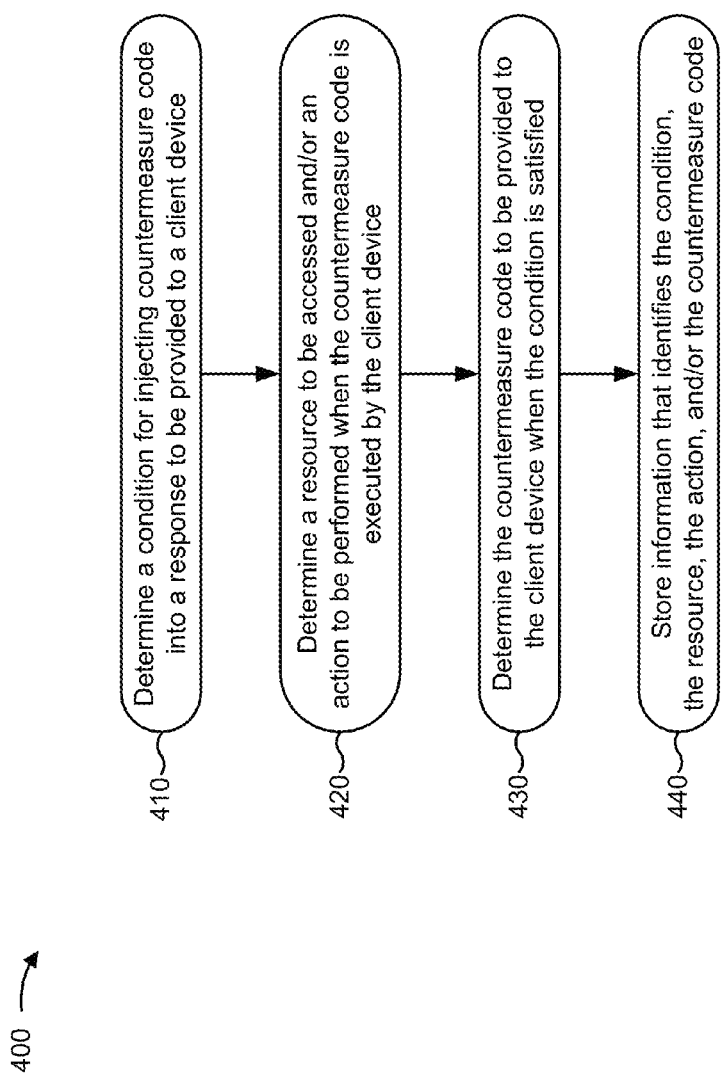
FIG. 4 is a flow chart of an example process for defining conditions, countermeasure code, resources, and/or actions to be utilized to counteract a malicious action performed by a user against a server device.

FIG. 4 is a flow chart of an example process 400 for defining conditions, countermeasure code, resources, and/or actions to be utilized to counteract a malicious action performed by a user against a server device. In some implementations, one or more process blocks of FIG. 4 may be performed by security device 230. In some implementations, one or more process blocks of FIG. 4 may be performed by another device or a group of devices separate from or including security device 230, such as client device 210 and/or server device 220.

As shown in FIG. 4, process 400 may include determining a condition for injecting countermeasure code into a response to be provided to a client device (block 410). For example, security device 230 may determine (e.g., based on user input) a set of conditions for injecting countermeasure code into a response to be provided to client device 210. Security device 230 may receive information identifying the set of conditions based on user input provided via a graphical user interface and/or received from another device (e.g., an input device). In some implementations, the set of conditions may indicate that client device 210 (e.g., a user of client device 210) is performing a malicious attack against server device 220. The set of conditions may be customizable based on user input.

As further shown in FIG. 4, process 400 may include determining a resource to be accessed and/or an action to be performed when the countermeasure code is executed by the client device (block 420). For example, security device 230 may determine (e.g., based on user input) a resource and/or an action associated with execution of the countermeasure code. In some implementations, security device 230 may receive information identifying a resource to be provided to client device 210 when client device 210 executes the countermeasure code. The resource may include, for example, an object accessible by security device 230, such as an image, a script, an animation, audio, a video, text, a file, a dialog (e.g., a chat dialog), or the like. In some implementations, security device 230 may receive the resource, and may store the resource so that security device 230 may provide the resource to client device 210 when the countermeasure code is executed (e.g., upon receiving a request for the resource from client device 210). For example, an administrator may use an input device to upload the resource to security device 230. In some implementations, security device 230 may provide a list of resources and/or a resource library (e.g., to an input device associated with the administrator), and may receive a selection of one or more resources from the list of resources.

Security device 230 may receive information identifying a key associated with a resource, in some implementations. The key may be used to identify the resource. In some implementations, security device 230 may include the key in countermeasure code (e.g., countermeasure code provided to client device 210), and may use the key to identify the resource (e.g., to retrieve the resource from memory) when the countermeasure code is executed by client device 210. Additionally, or alternatively, security device 230 may replace the key in the countermeasure code when providing the countermeasure code to client device 210. For example, security device 230 may replace the key with an identifier (e.g., a uniform resource locator, a uniform resource identifier, a network address, etc.) that points to the resource.

The key may represent a dynamic value, and security device 230 may replace the key in the countermeasure code with the dynamic value based on information determined by security device 230, in some implementations. For example, security device 230 may replace a key with a network address (e.g., an internet protocol (IP) address) of client device 210 (e.g., a key represented in the countermeasure code as ${client_address}, ${client_IP}, etc.), a host name of client device 210 (e.g., a key represented as ${client_hostname}), a name of a country associated with the network address of client device 210 (e.g., a key represented as ${client_country}), a name of a state associated with the network address of client device 210 (e.g., a key represented as ${client_state}), a host name of server device 220 (e.g., a key represented as ${server_hostname}), a uniform resource locator (URL) requested by client device 210 (e.g., a key represented as ${request_url}), a name of a file requested by client device 210 (e.g., a key represented as ${request_filename}), a path (e.g., the URL minus the file name) requested by client device 210 (e.g., a key represented as ${request_path}), a value of an HTTP POST parameter with a particular name (e.g., a key represented as ${post_field_name}), a value of an HTTP GET parameter with a particular name (e.g., a key represented as ${get_field_name}), a value of a request header with a particular name (e.g., a key represented as ${request_header_name}), a value of a response header with a particular name (e.g., a key represented as ${response_header_name}), a name of a referrer (e.g., a website from which client device 210 was referred) associated with client device 210 (e.g., a key represented as ${referrer}), custom information associated with client device 210 and/or the injected countermeasure code (e.g., a key represented as ${data}), or the like.

Security device 230 may receive information identifying an action to be performed when the countermeasure code is executed by client device 210, in some implementations. For example, the action may include providing a resource to client device 210. Additionally, or alternatively, the action may include removing the countermeasure code from a subsequent response, providing additional and/or different countermeasure code, etc. Security device 230 may determine the action based on information received from client device 210 and/or a current or past interaction with client device 210, in some implementations.

As further shown in FIG. 4, process 400 may include determining the countermeasure code to be provided to the client device when the condition is satisfied (block 430). For example, security device 230 may determine (e.g., based on user input) the countermeasure code to be provided to client device 210 when the set of conditions are satisfied. In some implementations, security device 230 may receive the countermeasure code based on user interaction with a graphical user interface (e.g., a text box provided via the user interface) and/or may receive the countermeasure code from another device (e.g., an input device). Additionally, or alternatively, security device 230 may generate the countermeasure code based on user input (e.g., based on user input identifying a condition, a resource, an action, a key, etc.). The countermeasure code may include, for example, HyperText Markup Language (HTML) code, a script (e.g., JavaScript, VBScript, etc.), Cascading Style Sheets (CSS) code, Extensible Markup Language (XML) code, Scalable Vector Graphics (SVG) code, etc.

As further shown in FIG. 4, process 400 may include storing information that identifies the condition, the resource, the action, and/or the countermeasure code (block 440). For example, security device 230 may store (e.g., in a memory accessible by security device 230) information identifying a set of conditions, countermeasure code, one or more resources, one or more actions, etc. Security device 230 may store the information as code, in a data structure, or the like. In some implementations, security device 230 may store information that identifies an association between a set of conditions, one or more resources, one or more actions, and/or countermeasure code. Security device 230 may use the stored information to counteract a malicious action by client device 210 when a set of conditions is met. In this way, security device 230 allows an administrator, associated with server device 220, to create a custom response to a malicious attack on server device 220.

Although FIG. 4 shows example blocks of process 400, in some implementations, process 400 may include additional blocks, fewer blocks, different blocks, or differently arranged blocks than those shown in FIG. 4. Additionally, or alternatively, two or more of the blocks of process 400 may be performed in parallel.

Figure 5:
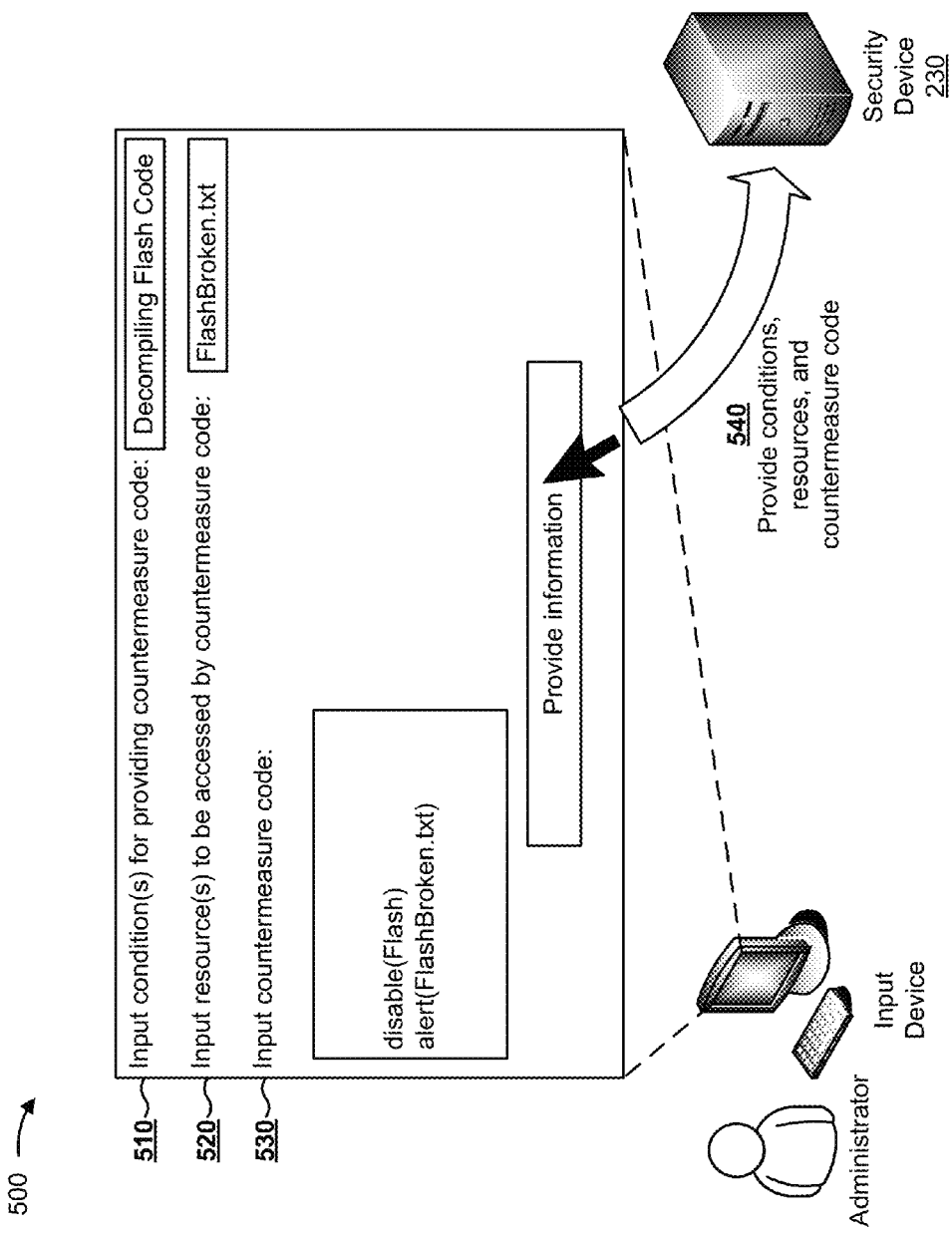
FIG. 5 is a diagram of an example implementation relating to the example process shown in FIG. 4.

FIG. 5 is a diagram of an example implementation 500 relating to example process 400 shown in FIG. 4. FIG. 5 shows an example of an administrator providing input to security device 230 to generate a custom response to a malicious attack on server device 220.

As shown in FIG. 5, assume that an administrator uses an input device to log into a web application provided by security device 230. Further assume that the web application provides a user interface via which the administrator is permitted to input information identifying conditions, resources, actions, countermeasure code, or the like, to be used to create a custom scenario to counteract malicious user activity. As shown by reference number 510, assume that the administrator inputs a condition shown as "Decompiling Flash Code." This condition may cause security device 230 to provide countermeasure code to client device 210 when security device 230 detects that client device 210 is decompiling a particular type of code (e.g., Flash code) associated with a website provided via server device 220. For example, a user may attempt to decompile Flash code to reverse engineer a Flash game provided via server device 220.

As shown by reference number 520, assume that the administrator inputs a resource identified as "FlashBroken.txt." This resource may include a text file that includes text to be provided to client device 210 when client device 210 executes the countermeasure code (e.g., "Sorry, but Flash is currently broken."). As shown by reference number 530, assume that the administrator inputs countermeasure code shown as disable(Flash), which may cause a Flash application running Flash code to be disabled on client device 210. Further, assume that the administrator inputs countermeasure code shown as alert(FlashBroken.txt), which may cause a notification to be provided, via client device 210, that displays the text in the FlashBroken.txt text file (e.g., "Sorry, but Flash is currently broken."). Further assume that the administrator interacts with an input mechanism (e.g., a button, a menu item, etc.) to cause the condition, the resource, and the countermeasure code to be provided to security device 230, as shown by reference number 540.

As indicated above, FIG. 5 is provided merely as an example. Other examples are possible and may differ from what was described with regard to FIG. 5.

FIG. 6 is a flow chart of an example process 600 for counteracting a malicious action performed by a user against a server device. In some implementations, one or more process blocks of FIG. 6 may be performed by security device 230. In some implementations, one or more process blocks of FIG. 6 may be performed by another device or a group of devices separate from or including security device 230, such as client device 210 and/or server device 220.

As shown in FIG. 6, process 600 may include determining that a condition, for injecting countermeasure code into a response to be provided to a client device, has been satisfied (block 610). For example, security device 230 may determine that a set of conditions has been satisfied. The set of conditions, when satisfied, may indicate that security device 230 is to inject countermeasure code into a response to be provided to client device 210. The set of conditions may be associated with a request, from client device 210, intended for server device 220. Security device 230 may provide the request to server device 220, and may receive a response from server device 220. The set of conditions may be customized for a particular server device 220, protected by security device 230, based on input from an administrator, in some implementations.

In some implementations, a condition may identify when security device 230 is to inject the countermeasure code into a response and/or when security device 230 is to respond to a request, from client device 210, by providing the countermeasure code to client device 210. For example, security device 230 may provide the countermeasure code to client device 210 based on a type of request received from client device 210, based on a quantity of requests received from client device 210, based on metadata associated with a request, based on the traffic and/or client device 210 matching an attack signature (e.g., based on client device 210 being identified as an attacking device), based on client device 210 being identified on a blacklist, based on a user associated with client device 210 performing a particular action (e.g., a malicious action), based on a quantity of times a user and/or client device 210 takes a particular action (e.g., associated with provided countermeasure code), based on client device information associated with client device 210 (e.g., a type of browser being used, a type of operating system being run, a previous interaction between client device 210 and security device 230 and/or network device 220, a geographic location associated with client device 210, etc.), or the like.

As further shown in FIG. 6, process 600 may include determining, based on the condition, the countermeasure code to inject into the response (block 620). For example, security device 230 may determine the countermeasure code to inject into the response based on the set of conditions being satisfied and/or based on a server device 220 from which the response was received. In some implementations, the set of conditions may be associated with particular countermeasure code, and a relationship between the set of conditions and the particular countermeasure code may be stored in memory accessible by security device 230. Security device 230 may determine the particular countermeasure code by accessing the memory and identifying the particular countermeasure code associated with the set of conditions. The countermeasure code may be customized for a particular server device 220, protected by security device 230, based on input from an administrator, in some implementations. In other words, the particular countermeasure code selected, when the same set of conditions is satisfied, may be different for a first server device 220 than for a second server device 220.

As further shown in FIG. 6, process 600 may include injecting the countermeasure code into the response and providing the response to the client device (block 630). For example, security device 230 may inject the countermeasure code into a response. The response may be generated by server device 220 based on a request from client device 210. Security device 230 may receive the response from server device 220, may determine that the countermeasure code is to be inserted (e.g., based on determining that a set of conditions have been satisfied), and may insert the countermeasure code into the response. Security device 230 may then provide the response, with the inserted countermeasure code, to client device 210. The response may include response code for serving content of a web page to client device 210, and security device 230 may insert the countermeasure code into the response code.

Security device 230 may determine an injection parameter that identifies a manner in which the countermeasure code is to be injected into the response, and may inject the countermeasure code into the response based on the injection parameter, in some implementations. The injection parameter may identify whether the countermeasure code is to be injected into the response, in some implementations. For example, even when a set of conditions is satisfied, security device 230 may not inject countermeasure code into the response in some scenarios. If security device 230 has already injected the countermeasure code and/or other countermeasure code into a previous response, for example, the injection parameter may indicate that security device 230 is not to inject countermeasure code into a subsequent response. Additionally, or alternatively, the injection parameter may indicate a quantity of times that security device 230 is to inject countermeasure code into different responses (e.g., when the set of conditions is satisfied), and may use a counter to keep track of the quantity of times that security device 230 has injected countermeasure code into a response. In some implementations, the injection parameter may include a random determination (e.g., a binary determination) that indicates whether security device 230 is to inject the countermeasure code into a particular response.

The injection parameter may indicate a location in the response (e.g., in response code) that security device 230 is to insert the countermeasure code, in some implementations. For example, the injection parameter may indicate that security device 230 is to insert the countermeasure code in a header of the response code (e.g., a response header), in the body of the response code, in a specific element included in the response code (e.g., a function, an attribute, etc.), within a threshold proximity of a particular portion of response code (e.g., a text, a script, etc.), in a random location in the response code, in a particular line of the response code (e.g., a random line), in a particular code segment of the response code (e.g., a random code segment), or the like. Additionally, or alternatively, the injection parameter may indicate a quantity of times and/or locations that security device 230 is to insert the countermeasure code within the response code.

Security device 230 may insert the countermeasure code into the response code based on the injection parameter, and may provide the response code, with the injected countermeasure code, to client device 210. Client device 210 (e.g., a browser running on client device 210) may execute the response code, including the countermeasure code, which may instruct client device 210 to perform a particular action (e.g., request a resource, perform an action with respect to a website associated with server device 220, etc.)

As further shown in FIG. 6, process 600 may include performing an action based on execution of the countermeasure code (block 640). For example, security device 230 and/or client device 210 may perform an action based on execution of the countermeasure code by client device 210. In some implementations, execution of the countermeasure code by client device 210 may cause client device 210 to request a resource (e.g., an image, a video, an animation, audio, text, etc.), identified in the countermeasure code, from security device 230. Security device 230 may receive the request, and may provide the requested resource to client device 210 (e.g., for display).

Execution of the countermeasure code by client device 210 may cause client device 210 to send client device information to security device 230, in some implementations. Client device information may include, for example, information that identifies an application running on client device 210 (e.g., a browser, an operating system, hacking software, etc.), information that identifies a file accessible by client device 210, contents of a file accessible by client device 210 (e.g., contents of memory, such as a hard drive, accessible by client device 210, contents of a file stored by client device 210, etc.), information that identifies a configuration associated with client device 210 (e.g., a hardware configuration associated with client device 210, a software configuration associated with client device 210, a peripheral device associated with client device 210, etc.), information captured based on execution of the countermeasure code (e.g., a screenshot of a display of client device 210, an image captured using a camera associated with client device 210, etc.), or the like.

Additionally, or alternatively, client device information may include information associated with execution of the countermeasure code by client device 210, such as whether client device 210 executed the countermeasure code, a quantity of times that client device 210 has executed the countermeasure code, whether execution of the countermeasure code was successful (e.g., whether security device 230 successfully received information from client device 210 due to countermeasure code execution), an action taken by a user and/or client device 210 associated with the countermeasure code (e.g., whether the user clicked an "Okay" button provided via the code, whether the user clicked a "Cancel" button, user input associated with provided countermeasure code, etc.), or the like. The client device information may be associated with client device 210, with a user of client device 210 (e.g., based on user login information, user profile information, user account information, etc.), with a session associated with client device 210 (e.g., a session between client device 210 and server device 220), or the like.

As further shown in FIG. 6, process 600 may include storing client device information associated with the client device (block 650). For example, security device 230 may determine and/or store client device information associated with client device 210. In some implementations, security device 230 may determine client device information based on providing the response code, with the countermeasure code, to client device 210. For example, security device 230 may store an indication (e.g., a counter value) of a quantity of times that the countermeasure code was sent to client device 210. Additionally, or alternatively, security device 230 may determine client device information based on information received from client device 210 (e.g., based on client device 210 executing the countermeasure code). Client device information may include information described elsewhere herein (e.g., in connection with block 640).

Security device 230 may store the client device information in a memory accessible via security device 230 (e.g., in a data structure), in some implementations. Additionally, or alternatively, security device 230 may store an association between the client device information and client device 210, a user, a session, etc., associated with the client device information. Security device 230 may store new client device information and/or may update (e.g., replace) stored client device information. Security device 230 may delete stored client device information, in some implementations. For example, security device 230 may delete stored client device information after a threshold amount of time has elapsed, after a session with client device 210 ends, etc.

In some implementations, execution of the countermeasure code by client device 210 may cause an application program interface (API), associated with security device 230, to be accessed. Security device 230 may use the API to add, update, and/or remove the client device information. The API may be accessed via execution of a script (e.g., a JavaScript function) included in the countermeasure code, in some implementations. Additionally, or alternatively, the API may be accessed using a URL (e.g., by directing the browser to a URL and sending the client device information via the URL), in some implementations.

As further shown in FIG. 6, process 600 may include removing the countermeasure code from a subsequent response provided to the client device (block 660). For example, security device 230 may receive a subsequent request from client device 210, may provide the subsequent request to server device 220, may receive a subsequent response from server device 220, and may provide the subsequent response to client device 210 without injecting the countermeasure code into the subsequent response. In this way, once an attacker using client device 210 discovers that an action has been performed based on execution of the countermeasure code, the attacker will not be able to view the countermeasure code to see what happened, or to block the countermeasure in the future. To further prevent an attacker from blocking and/or counteracting the countermeasure code, security device 230 may randomize characteristics of the countermeasure code, such as a location of the countermeasure code in the response (e.g., in response code provided by server device 220), one or more variable names used in the countermeasure code, an order of code segments (e.g., functions) included in the countermeasure code, a response in which the countermeasure code is included, etc. Additionally, or alternatively, security device 230 may randomly obfuscate the code, such as by changing variable names (e.g., included in countermeasure code and/or non-countermeasure code) in different responses, by inserting extra code (e.g., that may be randomized) that does not perform any action when executed, by changing an order of code segments (e.g., included in countermeasure code and/or non-countermeasure code), by nesting code in other segments of code (e.g., to an unbounded degree), by encrypting (e.g., randomly) one or more segments of code, or the like.

Security device 230 may provide different countermeasure code to client device 210 in a subsequent response, in some implementations. For example, the different countermeasure code may be different due to randomization. Additionally, or alternatively, the different countermeasure code may be different due to a different set of conditions being satisfied, resulting in different countermeasure code being provided (e.g., countermeasure code associated with a different resource, a different action, etc.). Security device 230 may perform process 600 as a loop, in some implementations, with different set of conditions triggering security device 230 to provide different countermeasure code to client device 210. In this way, a countermeasure to an attack, such as a security breach, an intrusion, a denial-of-service attack, etc., may be customized so that security device 230 handles the attack in a manner desired by an administrator associated with a server device 220 under attack.

Although FIG. 6 shows example blocks of process 600, in some implementations, process 600 may include additional blocks, fewer blocks, different blocks, or differently arranged blocks than those shown in FIG. 6. Additionally, or alternatively, two or more of the blocks of process 600 may be performed in parallel.

FIGS. 7A-7D are diagrams of an example implementation 700 relating to example process 600 shown in FIG. 6. FIGS. 7A-7D show an example of triggering different countermeasure responses based on different sets of criteria being satisfied. For the purpose of FIGS. 7A-7D, assume that an administrator, associated with server device 220, has provided input to security device 230 to generate the custom response described herein in connection with FIG. 5.

Figure 7A:
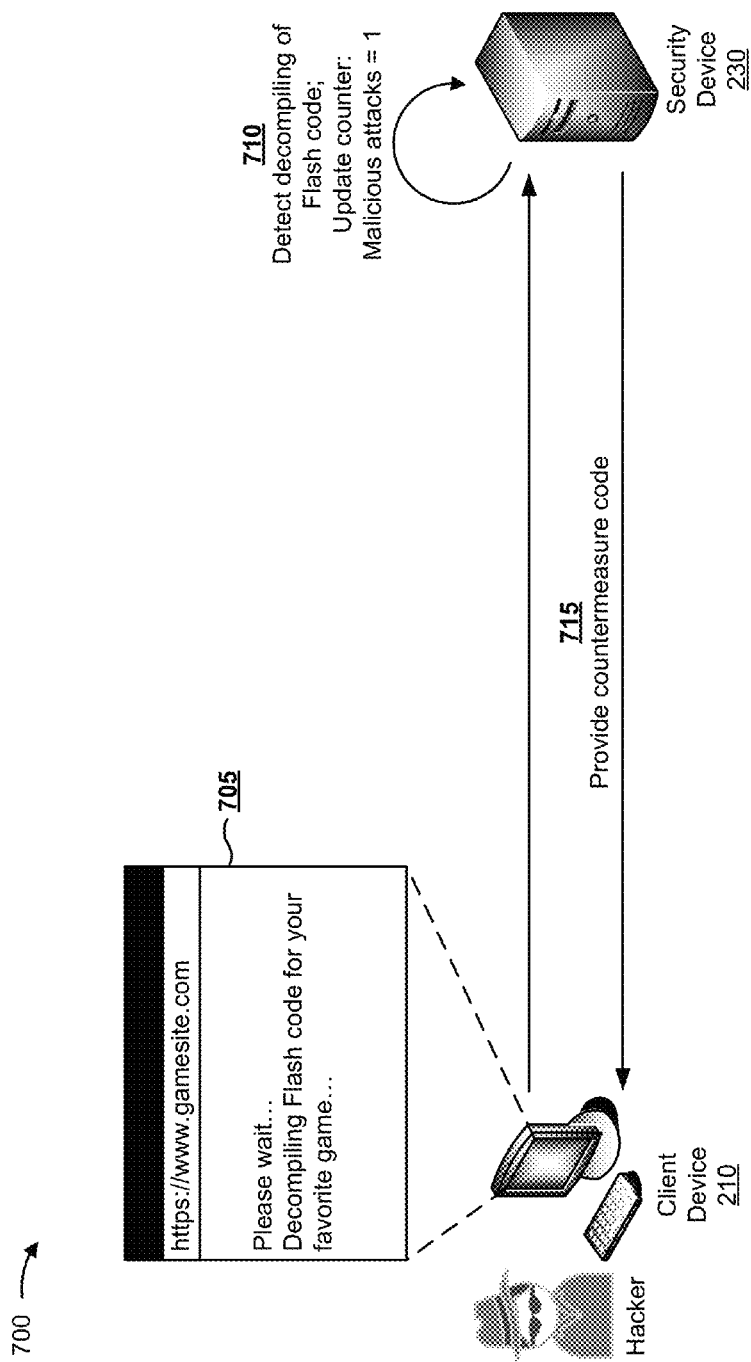
FIGS. 7A-7D are diagrams of an example implementation relating to the example process shown in FIG. 6.

As shown in FIG. 7A, assume that a hacker is attempting to reverse engineer a game written using Flash code, and provided via a website shown as www.gamesite.com. As shown by reference number 705, to reverse engineer the game, the hacker runs software on client device 210 to decompile the Flash code provided via the website. As shown by reference number 710, security device 230 detects the decompiling of the Flash code by client device 210 (e.g., based on a request sent by client device 210, intended for server device 220, and intercepted by security device 230). As shown by reference number 715, security device 230 provides countermeasure code (e.g., discussed herein in connection with FIG. 5) to client device 210, such as by injecting the countermeasure code into a response from server device 220. As further shown, security device 230 updates a malicious attack counter to indicate that client device 210 has performed one malicious attack and/or to indicate that the countermeasure code has been provided to client device 210 one time.

Figure 7B:
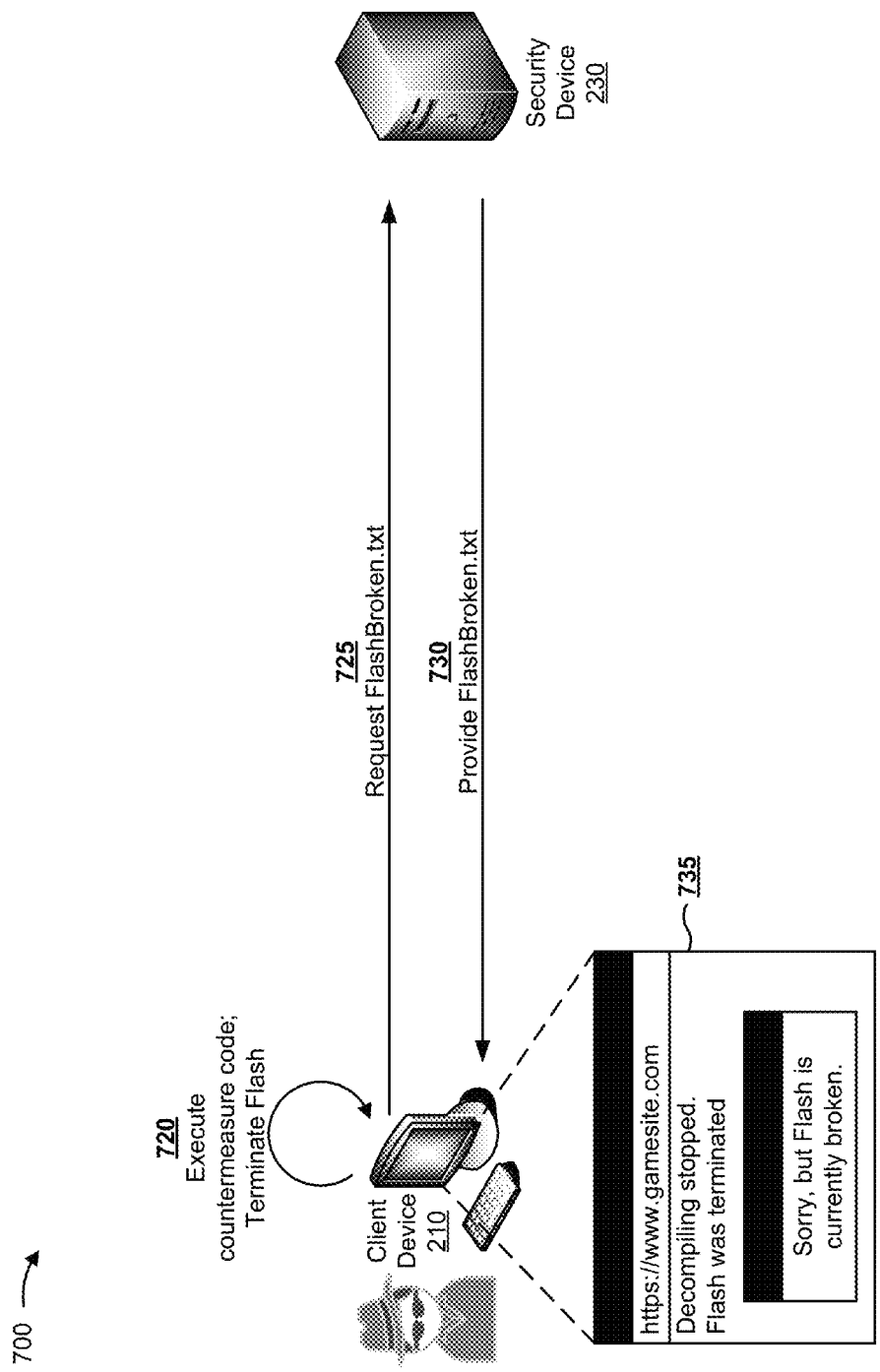

As shown in FIG. 7B, and by reference number 720, assume that client device 210 receives and executes the countermeasure code (e.g., using a browser), and that execution of the countermeasure code causes client device 210 to terminate Flash applications (e.g., prevents the browser from running and/or providing Flash code, so as to prevent decompiling of the Flash code). As shown by reference number 725, assume that execution of the countermeasure code further causes client device 210 to request a resource, shown as FlashBroken.txt, from security device 230. The resource may be identified in the countermeasure code, as described elsewhere herein. As shown by reference number 730, security device 230 provides the FlashBroken.txt resource to client device 210. As shown by reference number 735, client device 210 provides the FlashBroken.txt resource for display (e.g., via a browser). For example, client device 210 may provide a message, based on the countermeasure code and the resource, shown as "Sorry, but Flash is currently broken."

Figure 7C:
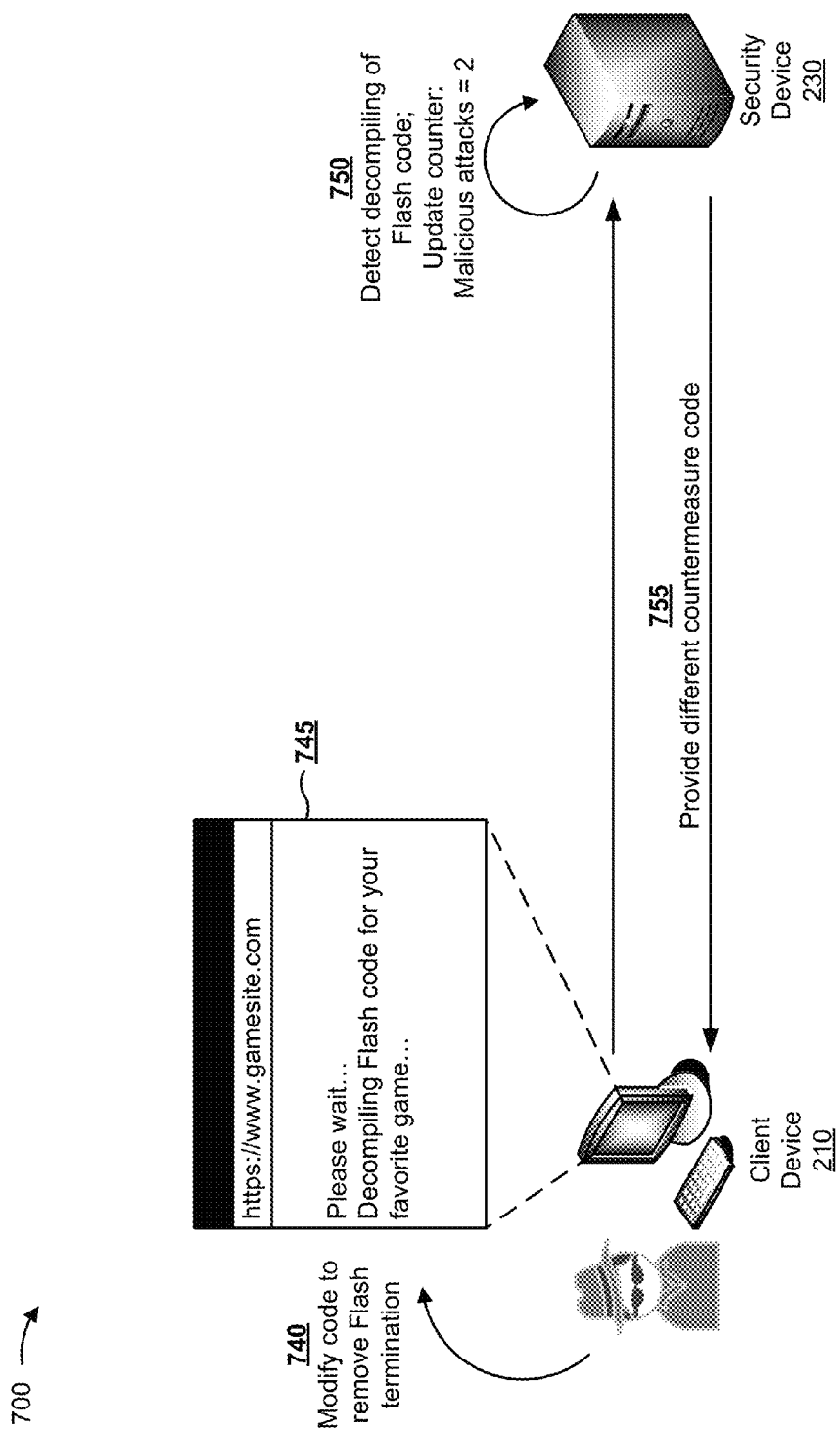

For the purpose of FIG. 7C, assume that client device 210 and server device 220 (and/or security device 230) interact several times, by sending requests and responses, and that the countermeasure code is removed from subsequent responses, such that the FlashBroken.txt resource is no longer displayed via the browser. At a later time, assume that the hacker figures out a way around the countermeasure, and begins to decompile the Flash code again. For example, as shown by reference number 740, the hacker may modify code associated with the website (e.g., response code, countermeasure code, etc.) to remove the Flash termination (e.g., to enable Flash code to be provided via the browser), and may run software to decompile the Flash code, as shown by reference number 745.

As shown by reference number 750, security device 230 detects the decompiling of the Flash code by client device 210. Assume that security device 230 determines different countermeasure code to provide to client device 210 based on client device information, such as a value of the malicious attack counter. For example, assume that client device 210 updates the malicious attack counter to indicate that client device 210 has performed two malicious attacks on server device 220, and that security device 230 provides different countermeasure code to client device 210, as shown by reference number 755.

Figure 7D:
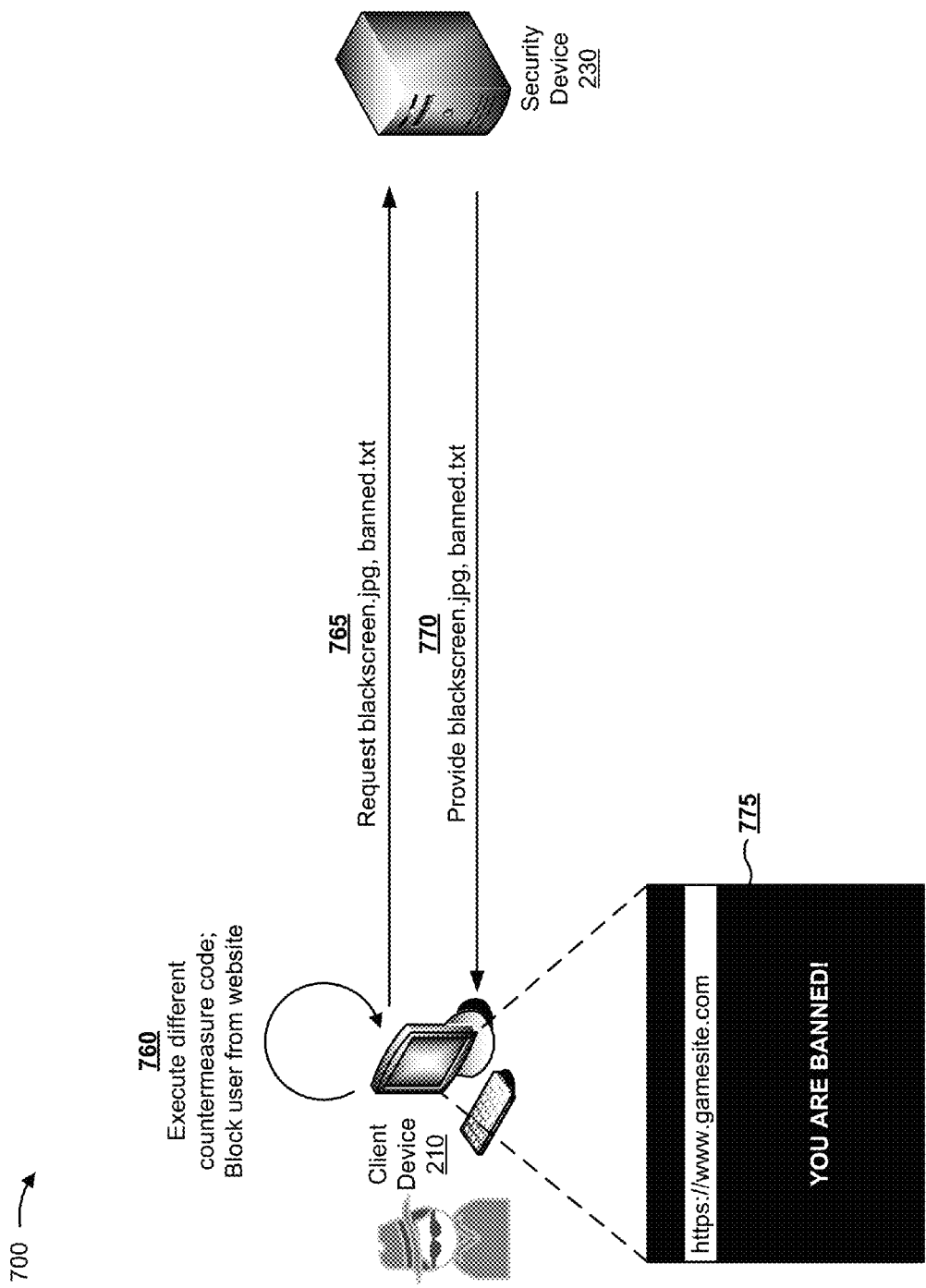

As shown in FIG. 7D, and by reference number 760, assume that client device 210 receives and executes the different countermeasure code (e.g., using a browser), and that execution of the different countermeasure code causes client device 210 to be blocked from the website. As shown by reference number 765, assume that execution of the countermeasure code further causes client device 210 to request two resources, shown as blackscreen.jpg and banned.txt, from security device 230. These resources may be identified in the countermeasure code, as described elsewhere herein. As shown by reference number 770, security device 230 provides the resources to client device 210. As shown by reference number 775, client device 210 provides the resources for display (e.g., a black screen and text shown as "YOU ARE BANNED!" provided via the browser).

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Some implementations are described herein as receiving information from a device or providing information to a device. These phrases may refer to receiving information directly from a device or providing information directly to a device, without the information being transferred via an intermediary device situated along a communication path between devices. Additionally, or alternatively, these phrases may refer to receiving information, provided by a device, via one or more intermediary devices (e.g., network devices), or providing information to a device via one or more intermediary devices.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A security device, comprising:
one or more processors to:
receive information identifying a set of conditions for injecting countermeasure code into a response to be provided to a client device;
receive information identifying an action to be performed when the countermeasure code is executed by the client device;
determine the countermeasure code to be provided to the client device when the set of conditions is satisfied,
the countermeasure code including a key that represents a dynamic value;
receive a request from the client device,
the request being intended for a server device associated with the security device;
receive, from the server device, the response to the request;
determine that the set of conditions has been satisfied;
determine the dynamic value based on the key, based on information associated with the client device or the request, and based on determining that the set of conditions has been satisfied;
replace the key, included in the countermeasure code, with the dynamic value based on determining the dynamic value;
inject the countermeasure code, including the dynamic value, into the response based on determining that the set of conditions has been satisfied;
provide the response, with the countermeasure code, to the client device,
the countermeasure code causing the client device to perform the action;
determine client device information based on providing the response to the client device,
the client device information identifying at least one of:
a quantity of times that the countermeasure code or other countermeasure code was provided to the client device,
a quantity of attacks associated with the client device,
a profile associated with the client device,
the action performed by the client device, or
an indication of whether the countermeasure code was executed by the client device; and
prevent the countermeasure code from being included in a subsequent response provided to the client device based on the client device information.

2. The security device of claim 1, where the one or more processors, when injecting the countermeasure code into the response, are to:
determine a location, within response code included in the response, where the countermeasure code is to be injected; and
inject the countermeasure code at the determined location within the response code.

3. The security device of claim 1, where the action includes requesting a resource from the security device; and
where the one or more processors are further to:
receive, from the client device, a request for the resource based on providing the response to the client device,
the countermeasure code causing the client device to request the resource; and
provide the resource to the client device based on receiving the request for the resource.

4. The security device of claim 1, where the one or more processors, when determining the client device information, are to:
determine the client device information based on execution of the countermeasure code by the client device.

5. The security device of claim 1, where the one or more processors are further to:
determine, based on the client device information, that a different set of conditions has been satisfied; and
where the one or more processors, when preventing the countermeasure code from being included in the subsequent response, are to:
determine particular countermeasure code to be included in the subsequent response based on determining that the different set of conditions has been satisfied,
the particular countermeasure code being different from the countermeasure code; and
inject the particular countermeasure code into the subsequent response.

6. A non-transitory computer-readable medium storing instructions, the instructions comprising:
one or more instructions that, when executed by one or more processors, cause the one or more processors to:
receive information identifying a set of conditions for providing countermeasure code to a client device;
receive information identifying an action to be performed when the countermeasure code is executed by the client device;
determine the countermeasure code to be provided to the client device when the set of conditions is satisfied,
the countermeasure code including a key;
receive a request from the client device;
determine a response to the request,
the response including response code for serving content of a web page to the client device;
determine that the set of conditions has been satisfied;
determine a dynamic value, corresponding to the key, based on information associated with the client device or the request, and based on determining that the set of conditions has been satisfied;
replace the key, included in the countermeasure code, with the dynamic value based on determining the dynamic value;
insert the countermeasure code, including the dynamic value, into the response code based on determining that the set of conditions has been satisfied;
provide the response code, including the countermeasure code, to the client device,
the countermeasure code causing the client device to perform the action;
determine client device information based on providing the response code to the client device,
the client device information identifying at least one of:
a quantity of times that the countermeasure code or other countermeasure code was provided to the client device, a quantity of attacks associated with the client device,
the action performed by the client device,
a profile associated with the client device, or
an indication of whether the countermeasure code was executed by the client device; and
prevent the countermeasure code from being included in a subsequent response provided to the client device based on the client device information.

7. The non-transitory computer-readable medium of claim 6, where the one or more instructions, that cause the one or more processors to insert the countermeasure code into the response code, cause the one or more processors to:
determine a location, within the response code, at which the countermeasure code is to be inserted; and
insert the countermeasure code at the determined location within the response code.

8. The non-transitory computer-readable medium of claim 6, where the one or more instructions, when executed by the one or more processors, cause the one or more processors to:
receive, from the client device, a resource request, that identifies a resource, based on providing the response code,
the countermeasure code, included in the response code, causing the client device to request the resource; and
provide the resource to the client device based on receiving the resource request.

9. The non-transitory computer-readable medium of claim 6, where the one or more instructions, when executed by the one or more processors, cause the one or more processors to:
determine, based on the client device information, that a different set of conditions has been satisfied;
determine particular countermeasure code to be included in the subsequent response based on determining that the different set of conditions has been satisfied,
the particular countermeasure code being different from the countermeasure code;
insert the particular countermeasure code into the subsequent response; and
provide the subsequent response, with the particular countermeasure code, to the client device.

10. A method, comprising:
receiving, by a security device, information that identifies a set of conditions for providing countermeasure code to a client device;
receiving, by the security device, information that identifies an action to be performed when the countermeasure code is executed by the client device;
determining, by the security device, the countermeasure code to be provided to the client device when the set of conditions is satisfied,
the countermeasure code including a key that represents a dynamic value;
receiving, by the security device, a request from the client device;
determining, by the security device, a first response to the request,
the first response including response code for serving content to the client device;
determining, by the security device, that the set of conditions has been satisfied;
determining, by the security device, the dynamic value based on the key, based on information associated with the client device or the request, and based on determining that the set of conditions has been satisfied;
replacing, by the security device, the key, included in the countermeasure code, with the dynamic value based on determining the dynamic value;
inserting, by the security device, the countermeasure code, including the dynamic value, into the response code based on determining that the set of conditions has been satisfied;
providing, by the security device, the response code, including the countermeasure code, to the client device, the countermeasure code causing the client device to perform the action;
determining, by the security device, client device information based on providing the response code to the client device,
the client device information identifying at least one of:
a quantity of times that the countermeasure code or other countermeasure code was provided to the client device,
a quantity of attacks associated with the client device,
the action performed by the client device
a profile associated with the client device, or
an indication of whether the countermeasure code was executed by the client device; and
preventing, by the security device, the countermeasure code from being included in a second response provided to the client device.

11. The method of claim 10, where inserting the countermeasure code into the response code comprises:
determining a location, within the response code, where the countermeasure code is to be inserted; and
inserting the countermeasure code at the determined location within the response code.

12. The method of claim 10, further comprising:
receiving, from the client device, a resource request, that identifies a resource, based on providing the response code,
the countermeasure code, included in the response code, causing the client device to request the resource; and
providing the resource to the client device based on receiving the resource request.

13. The method of claim 10, further comprising:
determining, based on the client device information, that a different set of conditions has been satisfied;
determining particular countermeasure code to be included in the second response based on determining that the different set of conditions has been satisfied,
the particular countermeasure code and the countermeasure code being different;
inserting the particular countermeasure code into the second response; and
providing the second response, with the particular countermeasure code, to the client device.

14. The security device of claim 1, where the dynamic value identifies a resource; and
where the one or more processors are further to:
receive, from the client device, a request for the resource based on providing the response to the client device; and
provide the resource to the client device based on receiving the request for the resource.

15. The non-transitory computer-readable medium of claim 6, where the dynamic value identifies a resource; and
where the one or more instructions, when executed by the one or more processors, cause the one or more processors to:
receive, from the client device, a resource request, that identifies the resource, based on providing the response code,
the countermeasure code, included in the response code, causing the client device to request the resource based on the dynamic value; and provide the resource to the client device based on receiving the resource request.

16. The non-transitory computer-readable medium of claim 6, where the dynamic value includes information that identifies the client device or information requested by the client device.

17. The method of claim 10, where preventing the countermeasure code from being included in the second response comprises at least one of:
   modifying the countermeasure code in the second response, or
   providing the second response without including the countermeasure code in the second response.

18. The security device of claim 1, where the one or more processors, when determining the client device information, are to:
   determine the client device information based on execution of the countermeasure code by the client device.

19. The non-transitory computer-readable medium of claim 6, where the one or more instructions, that cause the one or more processors to prevent the countermeasure code from being included in the subsequent response, are to:
   provide the subsequent response to the client device with injecting the countermeasure code into the subsequent response.

20. The method of claim 10, where inserting the countermeasure code into the response code comprises:
   obfuscating the countermeasure code in the response code.

* * * * *